United States Patent

Arnell et al.

[11] Patent Number: 5,941,072
[45] Date of Patent: Aug. 24, 1999

[54] TURBOCHARGED COMBUSTION ENGINE

[75] Inventors: Jan Arnell, Hisings Kärra; Magnus Dahlgren, VäStra Frölunda, both of Sweden

[73] Assignee: AB Volvo, Gothenburg, Sweden

[21] Appl. No.: 08/750,572

[22] PCT Filed: Jun. 15, 1995

[86] PCT No.: PCT/SE95/00730

§ 371 Date: Dec. 12, 1996

§ 102(e) Date: Dec. 12, 1996

[87] PCT Pub. No.: WO95/35437

PCT Pub. Date: Dec. 28, 1995

[30] Foreign Application Priority Data

Jun. 17, 1994 [SE] Sweden .................................. 9402136

[51] Int. Cl.⁶ ..................................................... F02B 37/02
[52] U.S. Cl. .......................... 60/605.1; 285/226; 285/299
[58] Field of Search ........................... 60/605.1; 285/224, 285/226, 299, 300

[56] References Cited

U.S. PATENT DOCUMENTS

| | | | |
|---|---|---|---|
| 1,921,907 | 8/1933 | Buchi | 60/605.1 |
| 2,305,809 | 12/1942 | Maisch | 285/226 |
| 3,692,337 | 9/1972 | Mischel | 285/299 |
| 3,739,572 | 6/1973 | Duerr . | |
| 4,372,120 | 2/1983 | Ford et al. | 60/605.1 |
| 4,559,783 | 12/1985 | Ampferer . | |
| 4,697,423 | 10/1987 | Conrad et al. . | |

FOREIGN PATENT DOCUMENTS 1 170 193   5/1964   Germany .

*Primary Examiner*—Michael Koczo
*Attorney, Agent, or Firm*—Young & Thompson

[57] ABSTRACT

Turbocharged combustion engine with a compressor unit (2) which is rigidly supported in a bracket bolted to the cylinder block. The outlet (10) of the exhaust manifold (8) communicates with the turbine inlet (7) to the compressor unit via a folded metal tube (14) which permits displacement of the turbine inlet and the outlet of the exhaust manifold relative to each other in a transverse and an axial direction.

1 Claim, 3 Drawing Sheets

TURBOCHARGED COMBUSTION ENGINE

FIELD OF THE INVENTION

The present invention relates to a turbocharged combustion engine comprising a cylinder block which is provided with an inlet manifold having an inlet, an exhaust manifold having an outlet and a compressor unit made up of a turbine portion and a compressor portion, which compressor unit presents a turbine inlet communicating with the outlet of the exhaust manifold and a turbine outlet communicating with the inlet of the inlet manifold.

BACKGROUND OF THE INVENTION

Combustion engines of the above-mentioned type known to date have compressor units rigidly mounted directly to the connecting flange of the exhaust manifold around the exhaust outlet so that differences in thermal expansion between the exhaust manifold and the cylinder block which creates relative displacement between the compressor unit and the cylinder block has no effect on the mounting of the compressor unit. The relative displacement between the compressor outlet and the inlet of the inlet manifold is compensated for by means of a flexible conduit between said outlet and inlet. A limitation of the known embodiment is that a possibly desirable connection between the compressor unit and a drive or driving arrangement rigidly associated with the cylinder block requires the use of universal joints or similar to compensate for the above-mentioned relative displacement.

SUMMARY OF THE INVENTION

The object of the present invention is generally to provide a combustion engine of the above-mentioned type in which the compressor unit is so arranged that a connection between the compressor unit and a drive or driving arrangement associated therewith which is rigidly connected to the cylinder block can be maintained without the need for universal joints or the like. More particularly, the object is to provide a combustion engine with a compressor installation which allows driving of the compressor unit from the cam shaft of the engine using an intermediate transmission rigidly bolted to the flywheel casing of the engine for gearing adjustment of the rotation speed of the compressor unit relative to the speed of rotation of the cam shaft.

This is achieved according to the invention by means of the compressor unit being rigidly affixed to the cylinder block and its turbine inlet communicating with the outlet of the exhaust manifold via a conduit which permits certain relative displacement between the compressor and the exhaust manifold.

In a preferred embodiment of the invention, the outlet of the exhaust manifold and the turbine inlet of the compressor unit communicate with each other via a folded metal tube, the ends of which are each provided with a sealing lip, with each lip abutting a respective ring-shaped surface on facing flanges around the outlet of the exhaust manifold and the turbine inlet of the compressor unit respectively. The one ring-shaped surface hereby forms the base of a depression which accommodates a portion of the folded tube and locates it in a transverse direction.

BRIEF DESCRIPTION OF THE DRAWINGS

The invention will be described in greater detail by way of example and with reference to the attached drawings in which.

DETAILED DESCRIPTION OF THE INVENTION

Figure 2:
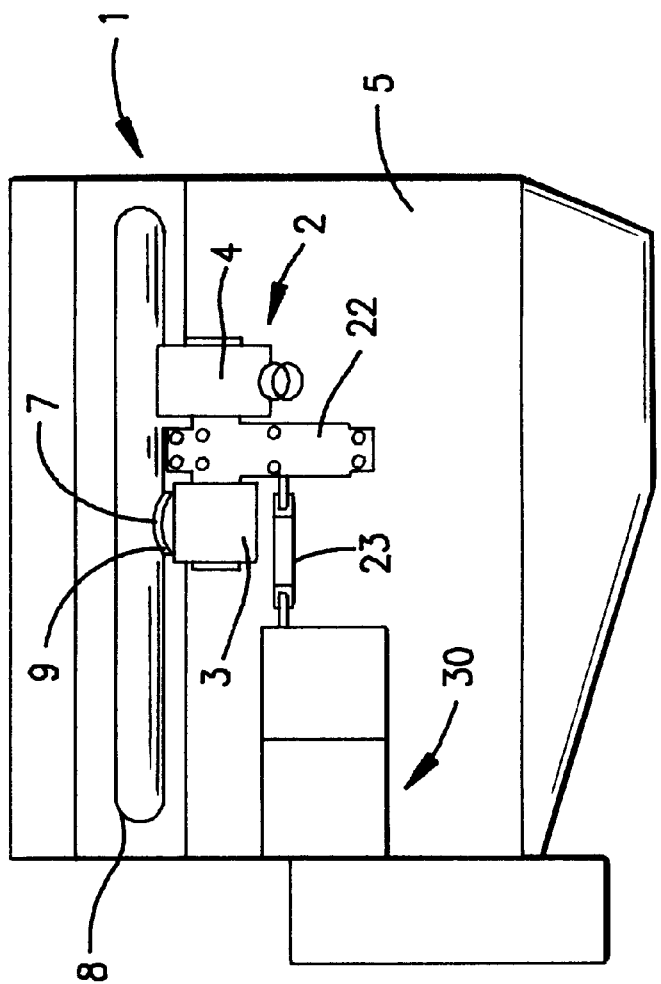
FIGS. 1 and 2 show a schematic elevational view and a half front view respectively of an engine according to the invention.
Figure 1:
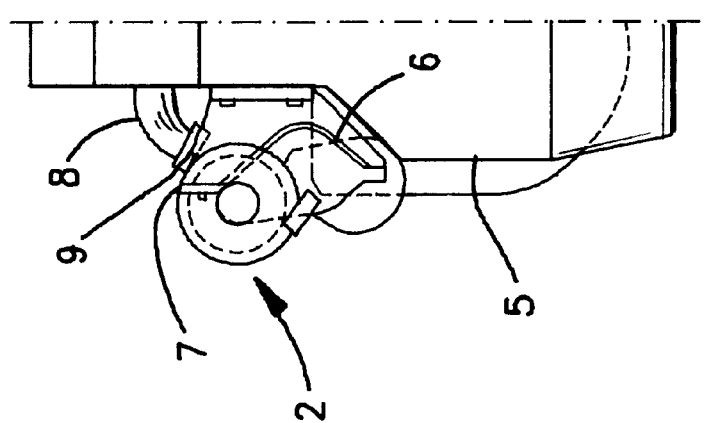
Figure 3:
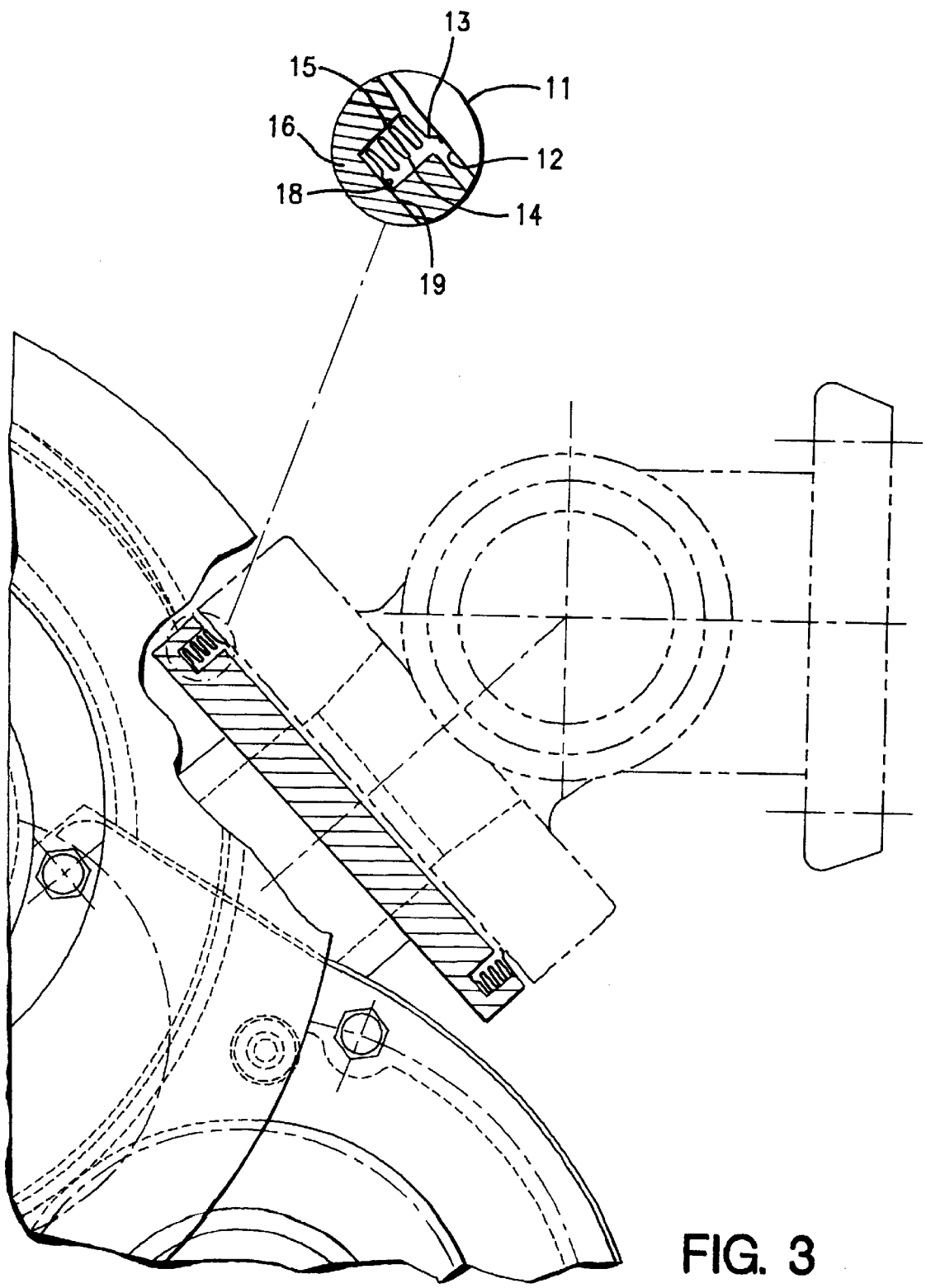
FIG. 3 shows a partial sectional view of an embodiment of the connection between the exhaust manifold of the engine and the compressor unit.
Figure 4:
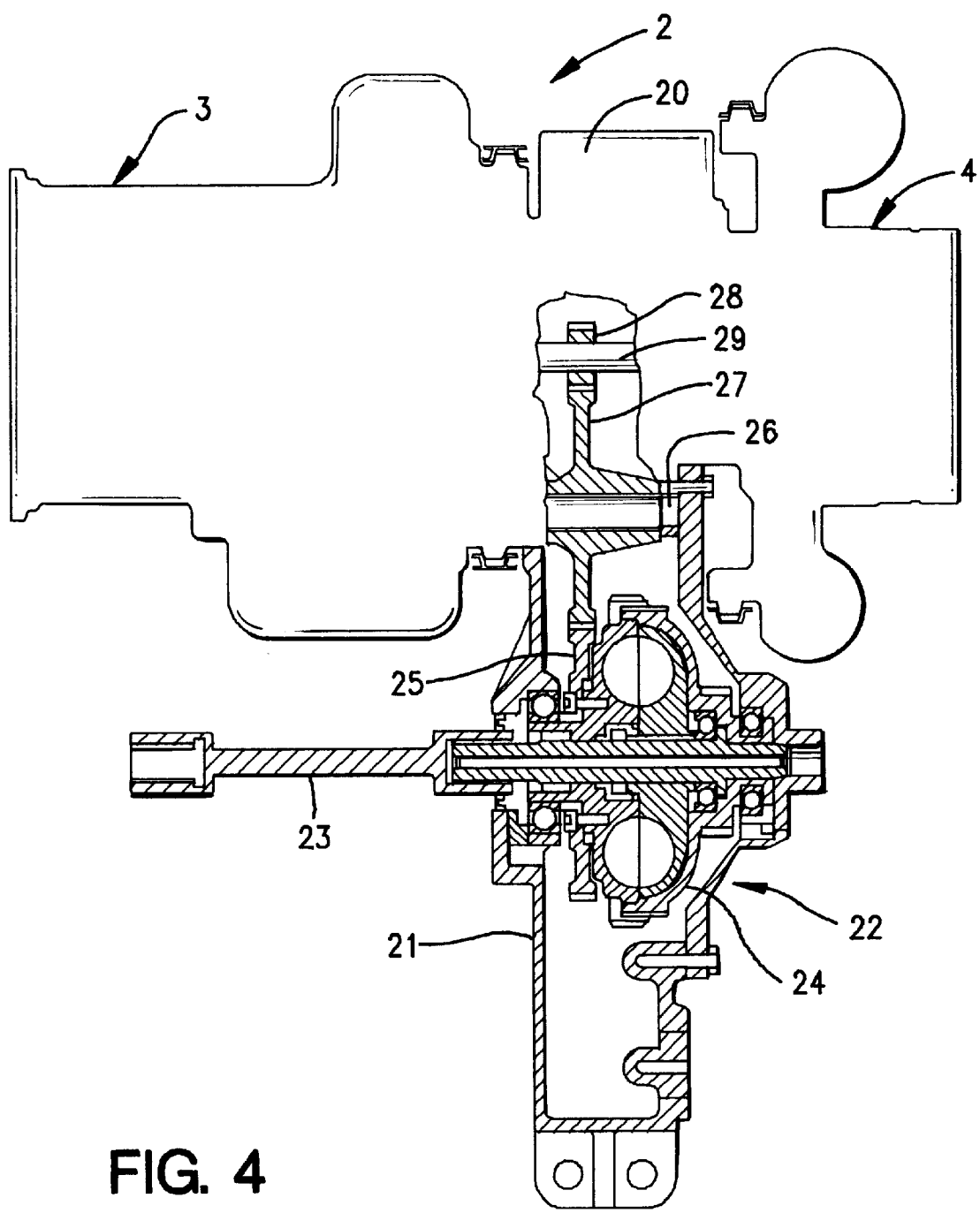
FIG. 4 shows a partial sectional elevational view of a transmission integrally constructed with the compressor unit.

In FIGS. 1 and 2, reference numeral 1 denotes a multi-cylinder diesel engine having a compressor unit generally denoted by 2 having a turbine portion 3 and a compressor portion 4. The compressor unit 2 is rigidly supported by a bracket 6 bolted to the cylinder block 5 and has its turbine inlet 7 (FIG. 3) connected to the exhaust manifold 8 of the engine via a flexible connection 9 which will be described in greater detail with reference to FIG. 3 and which permits certain displacement of the outlet of the exhaust manifold in relation to the inlet of the turbine portion 3, which displacement arises due to differences in thermal expansion. The compressor portion 4 is connected in a conventional manner (not shown in greater detail) via a flexible conduit to the air inlet manifold of the engine, for example via an intercooler.

The outlet 10 (FIG. 3) of the exhaust manifold is surrounded by a flange 11 which presents a flat surface 12 against which a sealing lip 13 on a bellows arrangement in the form of a folded metal tube 14 abuts. The tube 14 is accommodated in a ring-shaped depression 15 in a flange 16 which encircles the turbine inlet 7 to the compressor unit 2. A sealing lip 18 on the opposite end of the tube 14 rests against the base 19 of the depression 15. The described arrangement permits movement of the flanges 11 and 16 relative to each other both in a transverse direction and in an axial direction whilst maintaining a sealed connection between the exhaust outlet 10 and the turbine inlet 7. The exhaust pressure within the folded tube 14 hereby assists in pressing the sealing lips 13 and 18 against the respective surfaces 12 and 19 in order to ensure the sealing.

In the embodiment of the invention shown in the drawings, a portion of the housing 20 of the compressor unit 2 is integrally constructed with the housing 21 of the gear transmission 22 which comprises an input shaft 23 which drives a freely rotating gearwheel 25 concentrically mounted with respect to the shaft 23 via a torsion damper in the form of a hydrodynamic coupling 24.

A freely rotating gearwheel 27 on an intermediate shaft 26 engages the gearwheel 25 and a gearwheel 28 which is rotatable carried by the impeller shaft 29 of the compressor unit 2. Via a transmission having variable gearing which is schematically indicated by reference numeral 30 in FIG. 1, it is possible for example at low engine speed to drive the compressor unit from the cam shaft and to increase its rotational speed with respect to the engine's rotational speed. The increased charging capability of the compressor unit 2 which is hereby obtained can be used to increase the engine braking effect if the engine is equipped with, for example, an exhaust pressure regulator or compression brake.

We claim:
1. Combustion engine comprising a cylinder block provided with an inlet manifold having an inlet, an exhaust manifold having an outlet, and a compressor unit made up of a turbine portion and a compression portion, said com- pressor unit having a turbine inlet communicating with the outlet of the exhaust manifold and a compressor outlet communicating with the inlet of the inlet manifold, said compressor unit being mounted on a bracket rigidly bolted to the cylinder block, said turbine inlet communicating with the outlet of the exhaust manifold via a flexible bellows arrangement which permits certain relative displacement between the compressor unit and the exhaust manifold, said bellows arrangement comprising a folded metal tube having ends which are each provided with a sealing lip, each sealing lip abutting against a corresponding ring-shaped surface surrounding the outlet of the exhaust manifold and the turbine inlet of the compressor unit respectively, each ring-shaped surface being provided on a corresponding facing flange around the outlet of the exhaust manifold and turbine inlet of the compressor unit respectively, and at least one ring-shaped surface forming the base of a depression which accommodates a portion of the bellows arrangement.

* * * * *